United States Patent
Ellis

(10) Patent No.: US 8,788,262 B2
(45) Date of Patent: *Jul. 22, 2014

(54) INCORPORATION OF VARIABLES INTO TEXTUAL CONTENT

(71) Applicant: Facebook, Inc., Menlo Park, CA (US)

(72) Inventor: David C. Ellis, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,534

(22) Filed: Feb. 1, 2013

(65) Prior Publication Data

US 2013/0144608 A1 Jun. 6, 2013

Related U.S. Application Data

(63) Continuation of application No. 12/363,437, filed on Jan. 30, 2009, now Pat. No. 8,370,126.

(51) Int. Cl.
*G06F 17/27* (2006.01)
*G06F 17/21* (2006.01)
*G06F 17/28* (2006.01)
*G06F 17/24* (2006.01)

(52) U.S. Cl.
CPC .......... *G06F 17/21* (2013.01); *G06F 17/2881* (2013.01); *G06F 17/248* (2013.01)
USPC ............ 704/9; 704/4; 704/5; 704/7; 704/8; 704/2

(58) Field of Classification Search
USPC ........................................ 704/3–10
See application file for complete search history.

(56) References Cited

U.S. PATENT DOCUMENTS

| | | | | |
|---|---|---|---|---|
| 4,805,100 | A | * | 2/1989 | Ozeki ............................... 704/1 |
| 5,441,546 | A | * | 8/1995 | Moard et al. .................... 48/107 |
| 5,475,586 | A | * | 12/1995 | Sata et al. ......................... 704/2 |
| 5,587,902 | A | * | 12/1996 | Kugimiya ......................... 704/2 |
| 5,644,774 | A | * | 7/1997 | Fukumochi et al. .............. 704/4 |
| 6,611,498 | B1 | * | 8/2003 | Baker et al. .................... 370/252 |
| 6,956,845 | B2 | * | 10/2005 | Baker et al. .................... 370/352 |
| 7,080,002 | B1 | * | 7/2006 | Kim .................................. 704/2 |
| 2009/0198487 | A1 | * | 8/2009 | Wong et al. ....................... 704/4 |

* cited by examiner

*Primary Examiner* — Leonard Saint Cyr
(74) *Attorney, Agent, or Firm* — Fenwick & West LLP

(57) ABSTRACT

Embodiments of the invention provide techniques for incorporating variable values into textual content. In one embodiment, an abstract phrase including a text phrase and a variable at a particular position in the text phrase is received. The abstract phrase may include multiple variables. A text value for the variable is received. The text phrase of the abstract phrase is combined with the text value according to the particular position of the variable. An integration rule is applied at a boundary of the text phrase of the abstract phrase and the text value, where the integration rule is based on a language rule. The integration rule modifies a portion of the text phrase of the abstract phrase or a portion of the text value to produce an integrated phrase.

28 Claims, 4 Drawing Sheets

INCORPORATION OF VARIABLES INTO TEXTUAL CONTENT

CROSS-REFERENCE TO RELATED APPLICATION

This application is a continuation of U.S. patent application Ser. No. 12/363,437, filed on Jan. 30, 2009, entitled "Incorporation of Variables into Textual Content," which is incorporated by reference herein in their entirety.

BACKGROUND

This invention relates to text processing, and in particular to the incorporation of variables into textual content, including translated textual content.

Processes for translating textual content into various languages are well known. For example, the sentence, "She commented on my video," can be translated from English into various languages, such as Spanish or Finnish. This translation can be performed by a human translator or by an automated translator such as a computer program that uses a language dictionary and various translation algorithms. With either a human translator or an automated translator, the quality of the translation may vary. However, a competent human translator can often produce a higher quality translation of a text phrase and is less likely to change the meaning of the phrase or produce non-idiomatic translations.

Using a human translator to produce a translation generally requires effort and expense. As a result, it may be useful to have a human translator perform a single translation of a generic, or abstract, phrase with variables and have specific cases of the phrase be generated automatically. The variables are placeholders into which words or phrases can later be substituted.

Translating phrases with variables may be particularly useful in the context of a social networking website. A social networking website may have members who understand different languages and who desire to view phrases within the website in their particular language. The social networking website may also have members who are capable of translating phrases between languages and who are willing to perform these translations. Since many phrases appearing in a social networking website contain a particular person's name, it is useful to have members perform translations on phrases containing variables that can later be substituted with the particular name. The translation of text phrases containing variables, also referred to as tokens, is further described in U.S. application Ser. No. 12/329,288, filed on Dec. 5, 2008, entitled "Community Translation On A Social Network," which is incorporated by reference in its entirety.

As an example, an English phrase with variables is "[var1] commented on [var2]'s video." The variables [var1] and [var2] may represent names of people or other nouns, for example. The abstract phrase could cover "Juha commented on Nicolas's video," or "Juha commented on Dave's video," or "A user commented on Nicolas's video." A human translator may translate this abstract English phrase to an abstract Finnish phrase of "[var1] kommentoi [var2]n videota." When a specific case of the translated phrase needs to be produced (e.g., for display to a user), specific values can be substituted for the variables.

However, merely substituting values for variables in the translated phrase may produce an inaccurate or clunky translation of the original text. As a result, certain substituted values may not fit properly with the rest of the phrase, and the resulting translated phrase may have incorrect grammar or an incorrect meaning in the translated language.

SUMMARY

Addressing these deficiencies in existing systems, embodiments of the invention provide techniques for incorporating textual variable values into an abstract text phrase (i.e., a text phrase containing variables).

In one embodiment, an abstract phrase including a text phrase and a variable at a particular position in the text phrase is received. The abstract phrase may include multiple variables. A text value for the variable is received. The text phrase of the abstract phrase is combined with the text value according to the particular position of the variable. An integration rule is applied at a boundary of the text phrase of the abstract phrase and the text value, where the integration rule is based on a language rule. The integration rule modifies a portion of the text phrase of the abstract phrase or a portion of the text value to produce an integrated phrase.

In one embodiment, an abstract text phrase including a variable at a particular position in the abstract text phrase is received. A text value for the variable and metadata describing the variable is also received. A delimited phrase is created by inserting the text value into the abstract text phrase at the particular position. The text value is inserted with delimiter characters preceding and following the text value. An integration rule is selected from a set of rules based on various criteria such as a predetermined rule ordering. The integration rule is applied to the delimited phrase. The application of the rule includes determining whether the text of the delimited phrase satisfies a condition of the rule, and, if so, modifying the delimited phrase and possibly performing other actions associated with the rule. After the rule application, the delimiter characters are removed from the delimited phrase to produce an integrated phrase. The integration rule may beneficially cause the variable value and/or the abstract phrase to be modified, so that the resulting integrated phrase has correct spelling, grammar, and meaning In one embodiment, the set of integration rules can be applied as a whole, compiled into a finite state transducer.

In one embodiment, the condition of the rule is satisfied if a particular pattern is matched in the delimited phrase, and the action of the rule includes modifying the matched pattern. The pattern and the modification can be specified using regular expressions.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
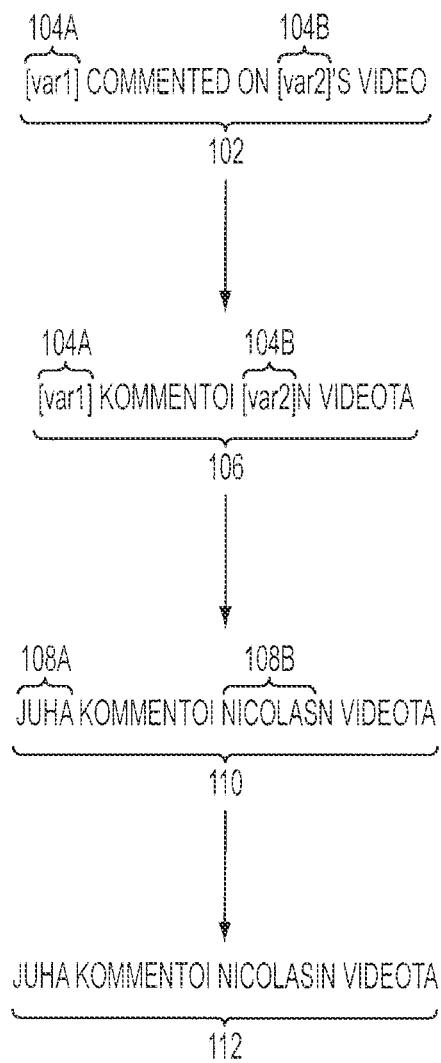
FIG. 1 illustrates an example of a translation of a text phrase with variables.

FIG. 1 illustrates an example of a translation of a text phrase with variables. A text phrase may be any grouping of text such as a portion of a sentence, a sentence, or a paragraph. The variables are placeholders into which specific words or text phrases can later be substituted. A text phrase with variables is also referred to here as an abstract phrase or generic phrase, since the phrase can represent several specific phrases depending on the variable values used.

Abstract phrase 102 contains text with two variables 104A and 104B. The variables are placeholders at the two indicated positions of the abstract phrase. The text phrase of the abstract phrase (i.e., the portion of the abstract phrase not including the variables) may also be referred to as the static portion of the abstract phrase. An abstract phrase may be translated into another language by a human translator. Such a translation involves translating the text of the abstract phrase and indicating locations in the translated text where the variables should appear. In FIG. 1, an English abstract phrase 102 has been translated into a Finnish abstract phrase 106 that still contains the two variables 104A and 104B.

Specific text values can then be applied to the variables by inserting the values at the locations specified by the variables. The resulting phrase is referred to as an insertion phrase, since the values are inserted at the variable locations. Insertion phrase 110 is the result when the value "Juha" is applied to [var1] and "Nicolas" is applied to [var2] in abstract phrase 106. Various other text could have been used as the variable values to produce other insertion phrases. The values may also be referred to as variable portions, so that the insertion phrase comprises a static portion and one or more variable portions.

While the insertion phrase 110 is approximately correct and might be understood by many Finnish speakers, it is not completely correct. To be improved, the insertion phrase must be modified based on the various possible pronunciations of "Nicolas" that trigger vowel epenthesis rules in Finnish. For example, if Nicolas is an English name, the phrase should be "Juha kommentoi Nicolasin videota." If Nicolas is a Finnish name of a one dialect, the phrase should be "Juha kommentoi Nicolaksen videota." If Nicolas is a Finnish name of another dialect, the phrase should be "Juha kommentoi Nicolaan videota." If Nicolas is a French name, the phrase should be "Juha kommentoi Nicolas'n videota." These modified phrases are also referred to as integrated phrases, since the variable values are properly integrated into the abstract phrase rather than merely being inserted. Integrated phrase 112 illustrates the case where Nicolas is an English name.

The primary reason for these differences is that the name Nicolas is pronounced differently depending on the locale of the name. For example, in French, the "s" at the end of Nicolas is silent, while in English it is pronounced, triggering the vowel epenthesis rule (e.g., the addition of the "i"). In Finnish (and in many other languages), the written form of a phrase is affected by the pronunciation of words in the phrase.

Generally, rules may beneficially modify the insertion phrase 110 for a variety of reasons beyond the vowel epenthesis rules in the above example. The rules can modify the phrase to comply with language rules, such as phonological language rules (dealing with a string of phonemes) or orthographic language rules (dealing with spelling). As described below, various rules can be applied to modify an insertion phrase 110 to produce a correct integrated phrase 112. These rules are also referred to as integration rules.

Figure 2:
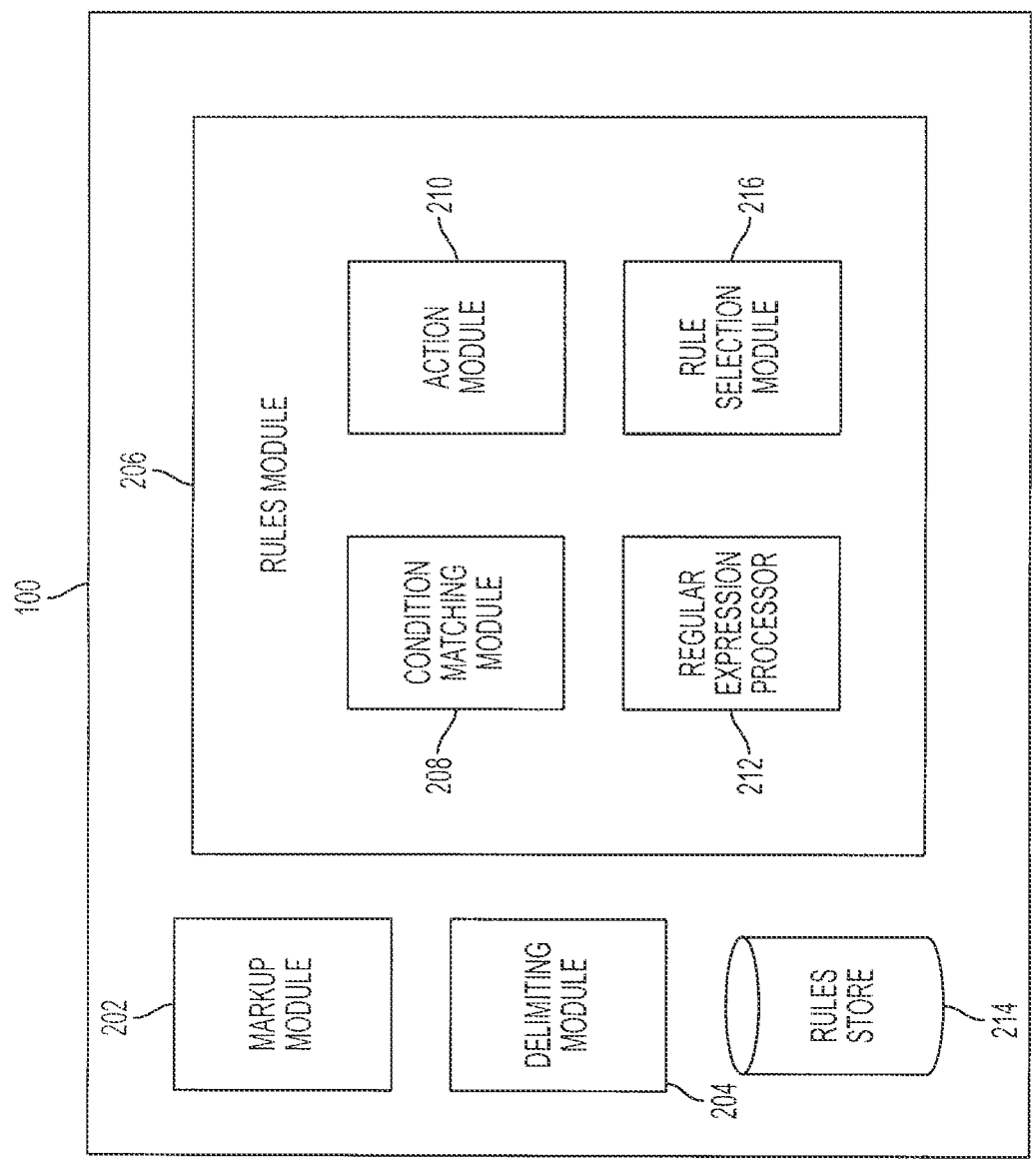
FIG. 2 illustrates a logical view of a system for incorporating textual variable values into an abstract phrase, in one embodiment.

FIG. 2 illustrates a logical view of a system 100 for incorporating textual variable values into an abstract phrase, in one embodiment. The environment includes a markup module 202, a delimiting module 204, a rules store 214, and a rules module 206. The rules module 206 includes a condition matching module 208, an action module 210, a rule selection module 216, and a regular expression processor 212. The modules may be executed on a computer including a processor, storage, and various input and output devices such as a monitor, network device, and keyboard.

Figure 3:
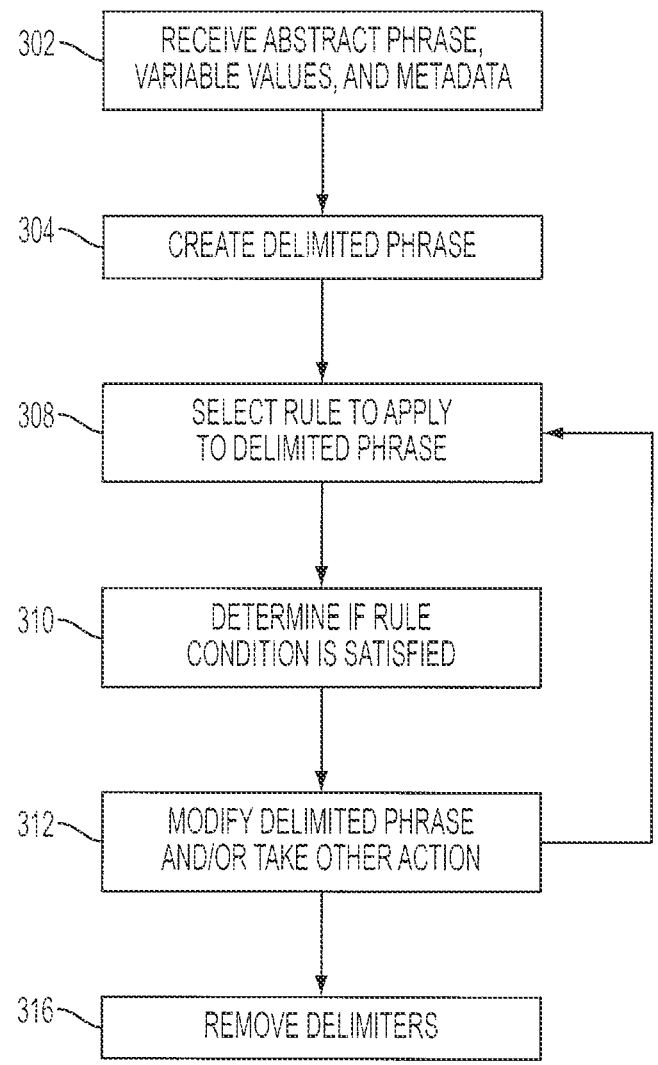
FIG. 3 illustrates a method for incorporating textual variable values into an abstract phrase, in one embodiment.

Embodiments of system 100 can be used for incorporating textual variable values into an abstract phrase. FIG. 3 illustrates a method for incorporating textual variable values into an abstract phrase, in one embodiment. Initially the delimiting module 204 receives 302 an abstract text phrase, variable values for insertion in the phrase, and metadata associated with the variable values. Alternatively, the delimiting module receives a static portion, on or more variable portions, and metadata associated with the variable portions.

Figure 4:
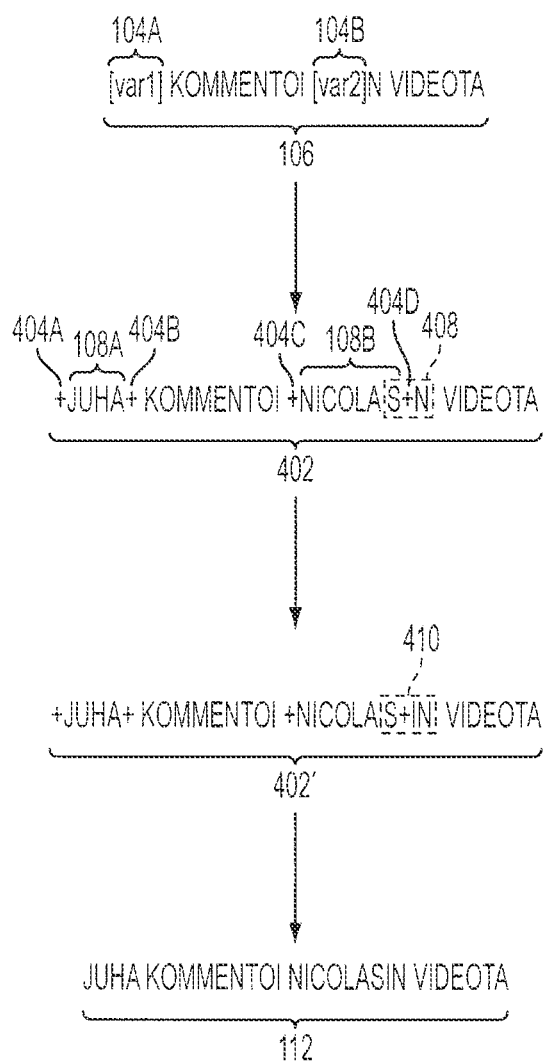
FIG. 4 illustrates an example of incorporating textual variable values into an abstract phrase.

As an example, suppose that abstract phrase 106 in FIG. 4 is received along with a value 108A of "Juha" for variable 104A ([var1]) and a value 108B of "Nicolas" for variable 104B ([var2]). The text portion of the abstract phrase can be referred to as a static portion, and the variable values can be referred to as variable portions. As mentioned above, the abstract phrase 106 may be a translation of an abstract phrase in a different language. Similarly, the variable values 108 may have been translated from a different language. In the example of FIG. 4, the variable values are proper names and may or may not require translation. However, if [var1] were "a user" in English, a Finnish translation of this variable value would need to be produced, automatically or manually, prior to substitution. The translation of variable values may be performed separately from the translation of the abstract phrase. A translated variable value can be used in multiple abstract phrases.

Metadata associated with the variable values 108 may also be received. Metadata includes various descriptive information about the variable values that may be used by the integration rules. Metadata may include the gender associated with a variable value (e.g., male or female or neither). Metadata may also include the locale of the variable value, particularly of a proper name (e.g., an English name, French name, Finnish name). Other types of metadata associated with a variable value may also be included. In the context of a social networking website, metadata associated with variable values can be obtained from data stored within the social networking website. For example, a variable value is often the name of a member as used in the social networking website. In such a case, the gender and locale of the member may be stored in the member's profile and can be easily accessed. In the example of FIG. 4, suppose that metadata is received that identifies value 108B ("Nicolas") as someone who is male and from England.

In step 304, the delimiting module 204 creates a delimited phrase 402. It does this by inserting the variable values 108 at the locations of the variables 104 specified in the abstract phrase 106. Delimiters 404 are inserted around the variable values to indicate the presence of boundaries between variable values and the text from the abstract phrase. In some cases, these are morpheme boundaries. The boundaries are often used by the integration rules, and the delimiters 404 are used by the rules to recognize the boundaries. The delimited phrase 402 is similar to the insertion phrase 110 with the addition of delimiters. In one embodiment, the delimiter 404 is a character that will never be contained in either the abstract phrase 106 or variable values 108. On possible value is the non-printable ASCII character '\x01'. For readability purposes, the '+' character is used as the delimiter in the description below and in FIG. 4, though in an actual implementation this may be undesirable if there is a possibility of the '+' character appearing in an abstract phrase or variable value. In one embodiment, the delimiter character is only inserted before or after the variable value rather than both before and after.

In step 308, the rule selection module 216 selects an integration rule from the rules store 214 to apply to the delimited phrase 402. This step of selecting a rule is discussed further below.

In step 310, the condition matching module 208 determines if the condition of the selected rule is satisfied by the delimited phrase. A rule includes a condition and an action to be performed if the condition is satisfied. A rule may also include an action to be performed if the condition is not satisfied.

In one embodiment, the rule condition may require a match of a particular pattern in the delimited phrase and the rule action may be to replace the matched pattern with a different pattern. Rules may also test for particular metadata associated with a variable value in order for the condition to be satisfied. In the example of FIG. 4, the initial delimited phrase 402 is "+Juha+kommentoi+Nicolas+n videota". Suppose that a rule being applied to this phrase searches for a consonant directly followed by a "+" directly followed by another consonant. In other words, the rule condition requires the presence of a delimiter surrounded by two consonants. Suppose the condition also requires that the variable value associated with the delimiter has metadata indicating that the locale of the variable is English. Accordingly, the condition matching module 208 would determine that the condition is satisfied by the character sequence 408 ("s+n") of the delimited phrase 402.

In step 312, the action module 210 modifies the delimited phrase and possibly takes other actions if the rule condition is satisfied. Suppose that the modification performed by the rule mentioned above is to replace the consonant-"+"-consonant sequence with a consonant-"+i"-consonant sequence. After this modification, the new delimited phrase 402' is "+Juha+kommentoi+Nicolas+in videota" since sequence 408 ("s+n") is replaced by sequence 410 ("s+in"). It can be seen that the integration rule has implemented a Finnish vowel epenthesis rule by inserting an "i" between the two consonants that happened to occur together after the variable substitution into the abstract phrase. In the current example, the rule is aware that the final "s" is not silent in the English pronunciation of "Nicolas". In one embodiment, the rule may have access to a dictionary with phonetic transcriptions of names to determine the pronunciation of names from various locales. The rule condition would depend on the pronunciation determined from the locale metadata rather than depending directly on the locale metadata as in the present rule.

In one embodiment, the condition of a rule can be matched multiple times and multiple modifications can be made to the delimited phrase as a result. In the current example, this may have occurred if there were more than one instance of the consonant-"+"-consonant sequence in the delimited phrase.

After the rule is applied, another rule can be selected 308 and applied. Since rules can modify the delimited phrase 402, the ordering of rules may be significant since an earlier applied rule may cause a modification to the delimited phrase that affects whether the phrase will match later applied rules. The rule ordering can be provided to the rule selection module 216 when choosing the next rule from the rules store 214 to apply.

In addition to modifying the delimited phrase, an action associated with a rule can change the sequence of rules that are applied. For example, the action for a particular rule may specify that if the rule is matched, then no further rules should be matched. The action may specify that certain further rules can be subsequently applied, but that certain others cannot be subsequently applied. For example, the rules may be grouped into certain classes and if one rule from a particular class of rules is matched, then no further rules from that class can be applied. The results of these actions affect subsequent rule selection by the rule selection module 216.

In one embodiment, the action may specify that the portion of the delimited phrase modified by the current rule should become "off limits" and that no further rules should match that portion of the phrase, but that subsequent rules can match and modify other portions of the phrase. In the current example, the rule that changed "+Nicolas+n" to "Nicolas+in" may specify that no further rules should match the modified sequence 410 but that further rules may match other portions of the intermediate phrase. For example, the first "+" delimiter of "+Nicolas+" or either delimiter of "+Juha+"can be matched and the surrounding characters can be modified by subsequent rules. This type of action may be implemented by instructing the condition matching module 208 to avoid a certain portion of the phrase for subsequent matches. It may also be implemented by having the action of the rule include removing the affected delimiter (e.g., the delimiter following "Nicolas") from the delimited phrase after performing the modification.

In one embodiment, a set of rules can be compiled into a finite state transducer (FST) and applied as a whole to the delimited phrase. The FST may implement rule conditions and actions as described in connection with FIG. 3. Rule dependencies, if any, may implicitly be included in the FST. The use of an FST may advantageously improve the efficiency of rule application.

In one embodiment, regular expressions can be used to specify rule conditions and modification actions. Regular expressions are expressions written in a formal language that can be interpreted by the regular expression processor 212. The regular expression processor examines the text of the delimited phrase 202 and identifies parts that match the regular expression. The regular expression processor can then modify the parts as specified by the substitution expression portion of the regular expression. A detailed description of regular expression syntax is provided in the book "Mastering Regular Expressions" by Jeffrey Friedl, $3^{rd}$ Edition (2006).

An example of a regular expression corresponding to the Finnish vowel epenthesis rule illustrated in FIG. 4 is "/(_C)\+(_C)/". The initial and final "/"s specify the beginning and end of the regular expression. The two "_C"s specify that a consonant should be matched. The \+indicates that the "+" delimiter should be matched. Therefore, the regular expression searches for a consonant followed by a "+" followed by another consonant. A corresponding substitution expression can be "$1+i$2". The $1 and $2 specify that the replacement should include the two matched consonants from the regular expression. As a result, the substitution expression specifies that the matched pattern should be replaced by the first consonant followed by "+" followed by "i" followed by the second consonant. This implements the condition and modification action of the rule discussed above, and would result in "+Nicolas+n" being modified to "Nicolas+in".

In this regular expression example, the symbol _C is used to represent a consonant, rather than listing all of the consonants directly in the regular expression. A regular expression with this abstraction may be preferred to a regular expression directly listing the consonants because it eases readability and debugging by encouraging concision and consistency. Also, since consonants may vary depending on the context (e.g., for some rules "y" may be a consonant and for some it may be a vowel), a new set of consonants can be easily defined for the regular expression. A regular expression containing a symbol such as _C may be transformed into a standard regular expression by applying a "metarule" regular expression to the primary regular expression. In this case, a metarule regular expression may be /_C/ (i.e., to search for "_C" in the primary regular expression) and the substitution expression may be the set of consonants, such as [bcdfg . . . ]. Metarule regular expressions can also be used to expand other classes of letters or strings in the primary regular expression.

In one embodiment, the scripting language PHP may be used to implement conditions and modification actions of rules. The use of PHP may be combined with the use of regular expressions.

Provided below is an additional discussion of integration rules that may be applied in various languages. In some cases, example regular expressions are also given.

In Spanish, conjunctions differ based on the surrounding words. For example "[var1] o [var2]" should be modified to "[var1] u [var2]" if the value of [var2] begins with "o" or a similar sound. The regular expression "/_Bo\+([Oo]|[Hh]o)/" can be used to detect this condition, and the substitution expression "$1u+$2" can be used to make the modification. Similarly, "[var1] y [var2]" should be modified to "[var1] e [var2]" if the value of [var2] begins with "i" or a similar sound (e.g., if [var2] is "hijo"). The regular expression "/_By \+([Ii]|[Hh]i[0e])/" can be used to detect this condition, and the substitution expression "$1e+$2" can be used to make the modification. For both regular expressions, a metarule regular expression is applied to expand the "_B" to "^(.*[.,!?\s]|)".

In Catalá, proper names are prefixed by a gendered article that must be modified based on the gender of the name. For example, "El [var]" must be changed to "La [var]" if [var] is a female name. Also, nouns (e.g., other than names) generally are gendered in many languages, requiring modification of the preceding article. Integration rules with conditions that take gender metadata into account can be developed to make such modifications.

In Russian, the gender of a name affects its declension in nominative, genitive, dative, accusative, instrumental, and prepositional (or locative) case. In Turkish, inflection involves both vowel harmony and constant cluster reduction, affecting any token in possessive, dative, or accusative case. Integration rules can be applied based on these factors.

In Arabic, language rules may affect the rendering of some characters when words are inflected. For example, "teh marbutta" becomes "teh" if it is at the end of a word and is now followed by a suffix (similar to "his" or "her" possessive markers). The gender of the viewer (or interlocutor) affects rendering of the word "you" and of imperative verb forms. The gender of a subject also affects verb conjugation, in which case different translation modifications can be performed depending on whether variable metadata specifies a name is male or female. Additionally, quantified nouns match their number, having singular, dual, or plural endings. Integration rules can be applied based on these factors.

In general, the development of rule conditions, rule actions, and rule orderings can be performed by someone knowledgeable in the language concerned. Often, the rule conditions will be evident to a fluent speaker of the language, particularly after the speaker notices that a direct variable value substitution produces an incorrect resulting translated phrase. In the context of a social networking website, feedback on translations generated using variable value substitution can be requested from users viewing the translations (such users will often be fluent in the language). This feedback can be used to create and improve rules. Rules can also be generated by examining grammar textbooks and linguistic papers commenting on language features.

In step 316, the delimiters 404 are removed from the delimited phrase 402' to reveal the final integrated phrase 112 in proper Finnish.

In one embodiment, the markup module 202 removes any markup that may be in the delimited phrase. An example of removed markup are HTML tags contained in the delimited phrase. These HTML tags may have been introduced to the delimited phrase from one of the variable values or from the text of the abstract phrase. The markup may usefully specify that a portion of a variable value or the abstract phrase should be formatted in a certain way (e.g., in bold or italic) or should have a HTML link associated with it. However, the markup may also interfere with the application of integration rules to the delimited phrase. To prevent this, the markup may be removed by the markup module 202 before the rules are processed. After the rules are processed, the markup may be re-inserted into the delimited phrase so that the markup is present in the final integrated phrase.

In the example of FIG. 4, suppose that [var2] contains markup and is actually "<a href='profile.php?id=1357'>Nicolas</a>", indicating a link to Nicolas's profile. The delimited phrase before markup removal would be "+Juha+kommentoi+<a href='profile.php?id=1357'>Nicolas</a>+n videota." The markup module can remove the markup to produce a delimited phrase 402 of "+Juha+kommentoi+Nicolas+n videota" as above. The markup and its position within the delimited phrase can be retained for future re-insertion. So, "<a href='profile.php?id=1357'>" can be remembered as being between the initial '+' delimiter and the 'N' of "+Nicolas+". In the case of HTML tags, markup can be identified by searching for text between "<" and ">" characters. In one embodiment, the markup is removed from the variable values and abstract phrase before creating the delimited phrase. In one embodiment, the markup is replaced with delimiters.

Once all of the applicable rules have been applied to the delimited phrase, markup module may re-insert any markup previously removed at the appropriate positions in the delimited phrase. If markup was present specifying "Nicolas" as an underlined link, then only the "Nicolas" portion of the newly formed "Nicolasin" would be linked (e.g., <u>Nicolas</u>in). The replacement point of the second markup tag could be modified so that it includes the entire word Nicolasin (e.g., <u>Nicolasin</u>). Either choice could be acceptable depending on style conventions.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   receiving an abstract phrase comprising a text phrase and a variable at a particular position in the text phrase;
   receiving a text value for the variable;
   combining the text phrase of the abstract phrase and the text value according to the particular position of the variable; and
   applying, by a computer system, an integration rule at a boundary of the text phrase of the abstract phrase and the text value to produce an integrated phrase, the integration rule based on a language rule, wherein the integration rule changes a portion of a word of the text phrase of the abstract phrase or a portion of a word of the text value so that the text phrase and the text value comply with the integration rule.

2. The method of claim 1:
   wherein combining the text phrase of the abstract phrase and the text value comprises:
      creating a delimited phrase, comprising:
         inserting the text value into the abstract phrase at the particular position indicated by the variable; and
         inserting a delimiter before and/or after the inserted text value;
   wherein applying the integration rule comprises:
      determining whether the delimited phrase satisfies a condition of the rule, the determining based at least in part on the location of a delimiter within the delimited phrase;
      responsive to the determination, performing an action of the rule, the action comprising modifying the delimited phrase; and
   wherein the method further comprises:
      creating an integrated phrase, comprising removing delimiters from the delimited phrase.

3. The method of claim 2, wherein determining whether the text of the delimited phrase satisfies a condition of the rule comprises determining whether a particular pattern of characters is present in the delimited phrase, the particular pattern including a delimiter character, and wherein modifying the delimited phrase comprises modifying the particular pattern of characters.

4. The method of claim 3, wherein the particular pattern of characters includes a delimiter character and a character from the abstract phrase.

5. The method of claim 3, wherein the particular pattern of characters is specified by a regular expression.

6. The method of claim 2, further comprising:
   prior to applying the rule, removing a markup element from the delimited phrase, the markup element at a particular markup location within the delimited phrase; and
   after applying the rule, re-inserting the markup element in the delimited phrase at the particular markup location.

7. The method of claim 2, wherein the integration rule prevents one or more further rules from being applied to a portion of the delimited phrase.

8. The method of claim 1, wherein the abstract phrase is a translation of an original abstract phrase in a different dialect, the original abstract phrase comprising the same variable.

9. The method of claim 1, wherein the integration rule is based on a phonological rule of a language.

10. The method of claim 1, wherein the integration rule is based on an orthographic rule of a language.

11. The method of claim 1, wherein multiple rules are applied, and wherein a subsequent rule is applied to text modified by a previously applied rule.

12. The method of claim 1, wherein the integration rule is selected based on at least gender information indicated by a social network user profile of a user associated with the text value.

13. The method of claim 1, wherein the integration rule is selected based on at least locale information indicated by a social network user profile of a viewing user to be provided with the integrated phrase.

14. The method of claim 1, further comprising:
   receiving metadata describing the text value for the variable, and
   wherein applying an integration rule at a boundary further comprises determining whether the metadata satisfies a condition of the rule.

15. A computer program product comprising a non-transitory computer-readable storage medium containing computer program code for:
   receiving an abstract phrase comprising a text phrase and a variable at a particular position in the text phrase;
   receiving a text value for the variable;
   combining the text phrase of the abstract phrase and the text value according to the particular position of the variable;
   applying an integration rule at a boundary of the text phrase of the abstract phrase and the text value to produce an integrated phrase, the integration rule based on a language rule, wherein the integration rule changes a portion of a word of the text phrase of the abstract phrase or a portion of a word of the text value so that the text phrase and the text value comply with the integration rule.

16. The computer program product of claim 15:
wherein combining the text phrase of the abstract phrase and the text value comprises:
  creating a delimited phrase, comprising:
    inserting the text value into the abstract phrase at the particular position indicated by the variable; and
    inserting a delimiter before and/or after the inserted text value;
  wherein applying the integration rule comprises:
    determining whether the delimited phrase satisfies a condition of the rule, the determining based at least in part on the location of a delimiter within the delimited phrase;
    responsive to the determination, performing an action of the rule, the action comprising modifying the delimited phrase; and
  wherein the computer program code is further configured for:
    creating an integrated phrase, comprising removing delimiters from the delimited phrase.

17. The computer program product of claim 16, wherein determining whether the text of the delimited phrase satisfies a condition of the rule comprises determining whether a particular pattern of characters is present in the delimited phrase, the particular pattern including a delimiter character, and wherein modifying the delimited phrase comprises modifying the particular pattern of characters.

18. The computer program product of claim 17, wherein the particular pattern of characters includes a delimiter character and a character from the abstract phrase.

19. The computer program product of claim 17, wherein the particular pattern of characters is specified by a regular expression.

20. The computer program product of claim 16, wherein the computer code is further configured for:
  prior to applying the rule, removing a markup element from the delimited phrase, the markup element at a particular markup location within the delimited phrase; and
  after applying the rule, re-inserting the markup element in the delimited phrase at the particular markup location.

21. The computer program product of claim 16, wherein the integration rule prevents one or more further rules from being applied to a portion of the delimited phrase.

22. The computer program product of claim 15, wherein the abstract phrase is a translation of an original abstract phrase in a different language, the original abstract phrase comprising the same variable.

23. The computer program product of claim 15, wherein the integration rule is based on a phonological rule of a language.

24. The computer program product of claim 15, wherein the integration rule is based on an orthographic rule of a language.

25. The computer program product of claim 15, wherein multiple rules are applied, and wherein a subsequent rule is applied to text modified by a previously applied rule.

26. The computer program product of claim 15, wherein the integration rule is selected based on at least gender information indicated by a social network user profile of a user associated with the text value.

27. The computer program product of claim 15, wherein the integration rule is selected based on at least locale information indicated by a social network user profile of a viewing user to be provided with the integrated phrase.

28. The computer program product of claim 15, wherein the computer code is further configured for:
  receiving metadata describing the text value for the variable, and
  wherein applying an integration rule at a boundary further comprises determining whether the metadata satisfies a condition of the rule.

* * * * *